(No Model.)

T. N. GIBSON.
CARBURETER.

No. 576,108. Patented Feb. 2, 1897.

Witnesses:
M. R. Remley
G. Y. Thorpe

Inventor:
T. N. Gibson,
by Higdon & Higdon
Attys.

UNITED STATES PATENT OFFICE.

THOMAS N. GIBSON, OF ARGENTINE, KANSAS.

CARBURETER.

SPECIFICATION forming part of Letters Patent No. 576,108, dated February 2, 1897.

Application filed February 24, 1896. Serial No. 580,612. (No model.)

*To all whom it may concern:*

Be it known that I, THOMAS N. GIBSON, of Argentine, Wyandotte county, Kansas, have invented certain new and useful Improvements in Carbureters, of which the following is a full, clear, and exact description, reference being had to the accompanying drawings, forming a part thereof.

My invention relates to gas-manufacturing apparatus; and it consists in its peculiar and novel features of construction and combinations of parts, as will be hereinafter described and claimed.

Figure 1:
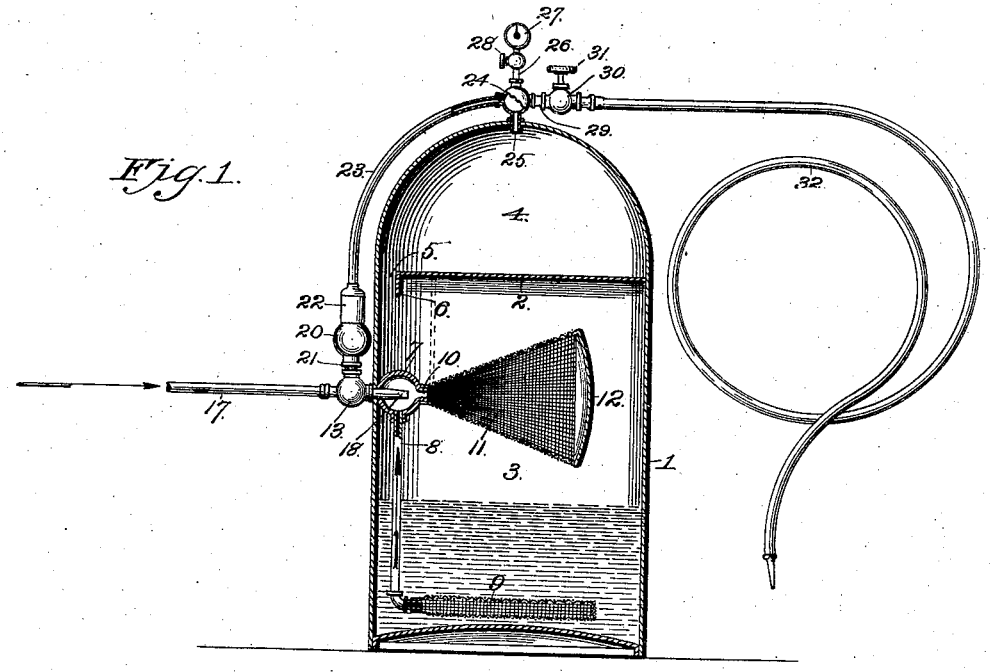
Figure 2:
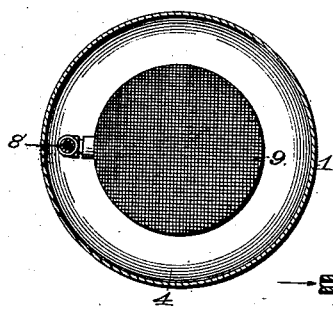
Figure 4:
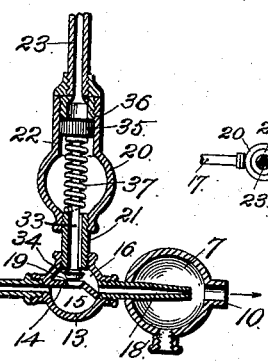
Figure 3:
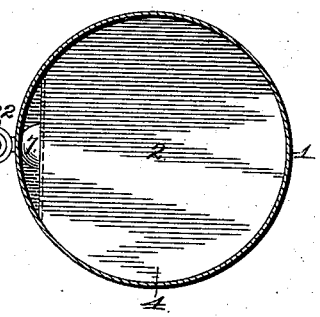

Referring to the drawings, Figure 1 represents, partly in central vertical section, a gas-manufacturing apparatus embodying my invention. Fig. 2 is a cross-section of the same near its lower end. Fig. 3 is a cross-section of the same near its upper end. Fig. 4 represents on an enlarged scale a vertical central section of a part of the apparatus.

In the said drawings, 1 designates a tank of any suitable size or configuration, but preferably cylindrical, as shown, and with its upper end arched or semispherical in form.

2 designates a horizontal partition which is arranged a suitable distance from the upper end of the tank and divides the same into a lower chamber 3 and an upper chamber 4, which chambers communicate through the narrow opening 5, formed by cutting a segment from the otherwise circular partition 2, as shown clearly in Fig. 3, and such partition at this point is provided with a depending flange 6, extending the entire length of said opening.

7 designates a mixing-chamber in the form of a hollow spherical casting preferably, and 8 a vertical pipe which communicates with said mixing-chamber and has its lower end coupled to a foraminous strainer 9, of wire or any other suitable material, which incloses the mouth or lower end of the pipe 8, so that any foreign element which may exist in the oil submerging said strainer may be extracted and thereby prevented from clogging said pipe, and consequently interfering with the operation of manufacturing gas.

10 designates a tubular nozzle of the mixing-chamber 7, which extends radially of the center of the tank and upon which is secured in any suitable manner the foraminous cone 11, of very fine wire or other suitable material, and the outer end or base of said cone is closed by an imperforate cap or plate 12.

13 designates a hollow and preferably spherical casting which is arranged at the outer side of the tank and is divided by a central diaphragm or partition 14 into a lower chamber 15 and an upper chamber 16, and 17 designates a pipe leading from any suitable air-pressure apparatus, which communicates with the chamber 15.

18 designates a discharge-nozzle which communicates with the upper chamber 16 and projects into the tank and the mixing-chamber 7 in radial alinement with the discharge-nozzle 10 of said chamber. The diaphragm or partition 14 is provided with a valve-seat opening 19, which affords communication between the chambers 15 and 16 and is controlled by a valve, to be hereinafter described.

20 designates a hollow and preferably spherical casting which is coupled by a short pipe 21 to the casting 13 above its diaphragm and is provided at its upper side with a vertical cylindrical extension 22, coupled in turn to the curved pipe 23, which pipe at its upper end communicates with one side of a four-way coupling 24, mounted upon the upper end of the tank and communicating with the chamber 4.

26 designates a vertical pipe which also communicates with said coupling and is provided with an ordinary pressure-gage 27 at its upper end, and mounted upon this pipe, below said gage, is an ordinary globe-valve or stop-cock 28, whose only function is to close the pipe 26 in case it is desired to remove and examine the gage. Such stop-cock normally stands open, in the customary manner.

29 designates another pipe which communicates with the interior of the four-way coupling and is provided with a valve 30, provided with the usual hand-wheel 31, whereby it may be quickly and conveniently operated, and coupled to said pipe outward of said valve is a flexible hose 32, of any suitable construction.

From the foregoing it is apparent that by forcing air at a suitable pressure through the pipe 17 it is discharged through the mixing-chamber and in such passage tends to create a vacuum in the pipe 8, and consequently exerts a suctional power which draws the oil contained in the bottom of the tank through the strainer 9 and up through the pipe 8 in a fine and continuous stream, which, entering the mixing-chamber 7, is discharged in the form of an exceedingly-fine spray into and against the foraminous cone 11, which is consequently dampened by the oil. Owing to such thin distribution of the oil and to its being so thoroughly commingled and intermixed with the air it quickly evaporates into a most serviceable fuel gas or vapor, which passes up through the opening 5 into the chamber 4, which will be hereinafter termed the "gas-chamber" in contradistinction to the lower or oil-containing and gas-forming chamber. As the air is continually forced into the tank, say at a pressure of eighty to one hundred pounds, evaporation of the oil and consequent production of gas continuously takes place, and the increasing pressure of gas is indicated by the gage 27. In order, therefore, to prevent the internal pressure becoming too high, and therefore dangerous, I have arranged a governor which automatically cuts off the air-supply when the pressure within the tank is about equal to such air-pressure, and which is constructed as follows: That is to say, 33 designates a stem which extends vertically through the casting 20 and through the pipe 21. It is provided at its lower end with a valve 34 and at its upper end with a piston 35, which operates within the cylindrical extension 22 of said casting. In order to hold said valve normally above the opening 19, a spring 37 spirally encircles the stem 33 and bears at its opposite ends against the upper end of the pipe 21 and the piston 35, which is therefore normally held against the internal shoulder 36 of the extension 22, as shown clearly in Fig. 4. While the valve is in such position, it is obvious that air has free passage to the interior of the tank, and it is equally obvious that immediately the pressure within the tank reaches a predetermined point, gaged by the resisting power of the spring 7, said piston is acted upon by such pressure from above and forced downwardly, so that the valve reliably closes the opening 19 and thereby cuts off the supply of air to the tank.

In practice, owing to the comparatively small size of these apparatus, and therefore limited capacity because of their portability, it is obvious that the supply of gas within the chamber 4 would be soon used up unless it was constantly added to. Therefore while in use the apparatus is continually manufacturing gas, so that the gas escapes at the outer end of the nozzle at a uniform and great pressure, and consequently is serviceable for quick heating. It is also obvious, however, that this apparatus may be made on a large scale with the hose 32 connected to a holder of any suitable construction, which when filled with gas at the required pressure may be cut off from the manufacturing apparatus, from which holder the gas may be used as required. This holder, however, forms no part of my invention. In the discharge of air and vapor from the mixing-chamber the imperforate cap or plate 12 forms a deflector, which insures the more thorough and equal distribution of the air and oil within the evaporating-cone 11, and in case of condensation upon the under side of the partition 2, which is provided to insure the thorough mixing of air and vapor rising from the evaporating-cone, it is deflected by the flange 6 and caused to drop down into the bottom of the tank, the flange serving also to prevent any upwardly-flying stream or streams of oil passing into the gas-chamber 4, as will be readily understood.

From the above description it will be apparent that I have produced a gas-manufacturing apparatus which will be found of great service in many different connections owing to the great heat which may be obtained and its portability, which permits it to be easily raised, if necessary, to the top of a coach or car. It may also, obviously, with slight modifications be employed for heating and other purposes by connecting it with burners of different formation.

Having thus described the invention, what I claim as new, and desire to secure by Letters Patent, is—

1. A gas-manufacturing apparatus, comprising a suitable tank, a partition dividing the same into a lower chamber and an upper chamber, which communicate, a mixing-chamber within the lower chamber, an evaporator arranged to receive the discharge from said mixing-chamber, a pipe communicating with the mixing-chamber and submerged in oil at its lower end, a hollow casting divided by a perforated diaphragm into two chambers, an air-supply pipe communicating with one of them, an air-discharge nozzle communicating with the other and projecting into the mixing-chamber, a hollow connection between the upper or gas chamber and the casting provided with the diaphragm, a stem therein, which is provided with a valve at one end and a piston at the other, whereby, when the pressure of the gas reaches a certain point it operates upon said piston and causes the valve to close the perforation of said diaphragm and cut off the supply of air to the mixing-chamber, substantially as set forth.

2. A gas-manufacturing apparatus, comprising a suitable tank, a partition dividing the same into a lower chamber and an upper chamber, which communicate, a mixing-chamber within the lower chamber, an evaporator arranged to receive the discharge from said mixing-chamber, a pipe communicating with the mixing-chamber and submerged in oil at its lower end, a hollow casting divided by a perforated diaphragm into two chambers, an air-supply pipe communicating with one of them, an air-discharge nozzle communicating with the other and projecting into the mixing-chamber, a hollow connection between the upper or gas chamber and the casting provided with the diaphragm, a stem therein, which is provided with a valve at one end and a piston at the other, a spring holding said valve away from its seat, and arranged so that when the pressure within the tank reaches a certain point it operates upon said piston and causes the valve to close the perforation of said diaphragm and cut off the supply of air to the mixing-chamber, substantially as described.

3. A gas-manufacturing apparatus, comprising a suitable tank, a partition dividing the same into a lower chamber and an upper chamber, which communicate, a mixing-chamber within the lower chamber, an evaporator arranged to receive the discharge from said mixing-chamber, a pipe communicating with the mixing-chamber and submerged in oil at its lower end, a hollow casting divided by a perforated diaphragm into two chambers, an air-supply pipe communicating with one of them, an air-discharge nozzle communicating with the other and projecting into the mixing-chamber, a hollow connection between the upper or gas chamber and the casting provided with the diaphragm, a stem therein, which is provided with a valve at one end and a piston at the other, whereby when the pressure of gas reaches a certain point it operates upon said plunger and causes the valve to close the perforation of said diaphragm and cut off the supply of air to the mixing-chamber, a hollow pipe provided with a gage connected to the gas-chamber, and a valve-controlled pipe also connected to the same and provided with a flexible hose having a jet or burner at its free end, substantially as described.

In testimony whereof I affix my signature in presence of two witnesses.

THOMAS N. GIBSON.

Witnesses:
M. R. REMLEY,
G. Y. THORPE.